US008726683B2

(12) United States Patent
Berghoff

(10) Patent No.: US 8,726,683 B2
(45) Date of Patent: May 20, 2014

(54) DEVICE FOR DEICING AND CLEANING OF FANS

(75) Inventor: Rudolf Erwin Berghoff, Unterschleiβheim (DE)

(73) Assignee: Linde Aktiengesellschaft, Munich (DE)

( * ) Notice: Subject to any disclaimer, the term of this patent is extended or adjusted under 35 U.S.C. 154(b) by 1173 days.

(21) Appl. No.: 12/297,720

(22) PCT Filed: Feb. 19, 2007

(86) PCT No.: PCT/EP2007/001427
§ 371 (c)(1), (2), (4) Date: Apr. 13, 2009

(87) PCT Pub. No.: WO2007/121803
PCT Pub. Date: Nov. 1, 2007

(65) Prior Publication Data
US 2009/0272133 A1 Nov. 5, 2009

(30) Foreign Application Priority Data
Apr. 20, 2006 (DE) ......................... 10 2006 018 384

(51) Int. Cl.
*A23L 3/36* (2006.01)

(52) U.S. Cl.
USPC .................................... 62/303; 62/82; 62/154

(58) Field of Classification Search
USPC .............. 62/303, 154, 155, 374, 380; 416/39, 416/146 R, 116, 123, 199; 15/301–302, 15/3.14, 316.1
See application file for complete search history.

(56) References Cited

U.S. PATENT DOCUMENTS

| | | | | |
|---|---|---|---|---|
| 3,403,527 | A | 10/1968 | Berreth et al. | |
| 4,229,947 | A | 10/1980 | Klee | |
| 4,315,414 | A * | 2/1982 | Ibrahim | 62/231 |
| 4,366,003 | A * | 12/1982 | Korte et al. | 134/18 |
| 4,389,820 | A * | 6/1983 | Fong et al. | 451/75 |
| 4,481,782 | A * | 11/1984 | Mukerjee | 62/63 |
| 5,168,711 | A | 12/1992 | Moore et al. | |
| 6,666,038 | B1 * | 12/2003 | Hynes | 62/171 |
| 6,840,187 | B2 * | 1/2005 | Tible | 114/222 |
| 6,877,327 | B2 * | 4/2005 | Newman et al. | 62/64 |
| 2005/0138946 | A1 * | 6/2005 | Sauter | 62/303 |

FOREIGN PATENT DOCUMENTS

| | | | | |
|---|---|---|---|---|
| DE | 26 16 198 A1 | | 10/1977 | |
| GB | 1 442 028 A | | 7/1976 | |
| JP | 2000-350411 | * | 12/2000 | H02K 9/04 |
| WO | WO 92/10683 A | | 6/1992 | |
| WO | WO 96/32877 A | | 10/1996 | |

* cited by examiner

*Primary Examiner* — Cassey D Bauer
(74) *Attorney, Agent, or Firm* — Joshua L. Cohen

(57) ABSTRACT

The invention pertains to a method and apparatus for removing ice layers and/or snow layers and/or dirt layers from the rotor blades of axial fans in cooling installations for refrigerating and/or freezing products. At least one cleaning substance jet is directed toward the rotor blades of an axial fan within certain time intervals in such a way that ice layers and/or snow layers and/or dirt layers are at least separated from the surfaces of the rotor blades and transported away, wherein the rotor blades rotate with nominal speed while cleaning jets act upon their surfaces.

1 Claim, 3 Drawing Sheets

DEVICE FOR DEICING AND CLEANING OF FANS

BACKGROUND OF THE INVENTION

The invention pertains to a method for removing ice layers and/or snow layers and/or dirt layers from the rotor blades of axial fans in cooling installations for refrigerating and/or freezing products, as well as to an apparatus for carrying out this method.

An axial fan as it is sufficiently known from the state of the art is a fluid flow engine that is equipped with a rotor, on the circumference of which rotor blades are arranged. Due to the geometry of the rotor blades, the rotating rotor is able to take in gas and pass on the gas in the direction of its rotational axis (axially) with increased pressure, wherein this is the reason why rotor blades have so-called suction sides and pressure sides.

In order to refrigerate and/or freeze products, particularly food products, it is common practice to utilize refrigerating devices, in which the products are transported through a treatment zone, wherein heat of the products is absorbed in said treatment zone by a cool atmosphere. One popular refrigerating device, for example, is a so-called tunnel froster, in which food products are brought in contact with cold gas such as, e.g., cold carbon dioxide, nitrogen or cold air and thusly refrigerated and/or frozen while they continuously move through a housing of tunnel-like design. In order to improve the heat transfer from the products to the cold atmosphere, the cold atmosphere is frequently circulated within the treatment zone with the aid of one or more fans. Part of the humidity that is admitted into the treatment zone with the products to be refrigerated or the ambient air is absorbed by the cold atmosphere and precipitated in the form of ice or snow at a different location within the refrigerating device. This effect causes the formation of ice layers or snow layers on solid surfaces, particularly also on the rotor blades of the fans. The geometries of the rotor blades in the non-icy state are optimized with respect to the output of a fan, i.e., the maximum volumetric flow rate of the cold atmosphere to be circulated by the fan. This means that deviations from the optimal geometry as they may be caused by an ice layer reduce the output and therefore lower the speed of the cold gas flowing past the products. The same effect also occurs when dirt layers are deposited on rotor blades.

The heat transfer between a solid body and a gas is highly dependent on the relative speed between the gas and the solid body: the lower the relative speed, the worse the heat transfer. Consequently, ice layers and/or dirt layers on the rotor blades of fans lead to a deterioration of the heat transfer from the products to be refrigerated to the cold atmosphere and therefore to a reduced refrigerating capacity of a refrigerating device. If the refrigerating capacity falls short of a predetermined value, it is necessary to interrupt the production of apparatuses according to the state of the art in order to open the refrigerating device and to clean the rotor blades. Ice layers and/or dirt layers deposited on rotor blades therefore significantly affect the efficiency of such refrigerating and/freezing methods.

SUMMERY OF THE INVENTION

The present invention consequently is based on the objective of disclosing a method of the initially described type that makes it possible to quickly remove ice layers and/or snow layers and/or dirt layers on rotor blades without having to interrupt the production.

According to the invention, this objective is attained in that at least one cleaning substance jet is directed toward the rotor blades of an axial fan within certain time intervals in such a way that ice layers and/or snow layers and/or dirt layers are at least separated from the surfaces of the rotor blades and transported away, wherein the rotor blades rotate with nominal speed while cleaning jets act upon their surfaces.

Ice layers and/or snow layers and/or dirt layers on rotor blades are removed during the continued production with such a method. However, the output of the fan is reduced during a cleaning method carried out in accordance with the invention due to the altered flow conditions. Since such an inventive cleaning process is completed within less than two seconds, however, it only affects the refrigerating capacity of the refrigerating device insignificantly. It is therefore sensible to repeat the inventive cleaning process within shorter time intervals than a cleaning process according to the state of the art.

The cleaning jets are preferably produced with cleaning nozzles. If the cleaning jet consists of a gas jet, the cleaning jets are advantageously generated by means of supersonic nozzles such that the cleaning jets have a supersonic speed—at least at the outlet of the cleaning nozzles. Due to the utilization of supersonic nozzles, gaseous cleaning jets with high momentum and therefore high cleaning effect are produced.

According to the invention, the cleaning jets consist of substances that do not lead to a contamination of the products being refrigerated and/or frozen in the refrigerating device and do not freeze to any location of the refrigerating device. The cleaning jets therefore preferably consist of dehumidified compressed air or nitrogen or carbon dioxide gas or mixtures of nitrogen and/or carbon dioxide gas and/or dehumidified compressed air.

According to one variation of the inventive method, cleaning jets that contain solid carbon dioxide (dry ice) are produced of liquid, pressurized carbon dioxide by means of suitable expansion. This variation is particularly suitable for cleaning rotor blades in refrigerating devices, in which liquid carbon dioxide is used for refrigerating and/or freezing products.

According to another variation of the inventive method, a mixture of a suitable gas and a granulate consisting of solid carbon dioxide (dry ice) is used for producing the cleaning jets.

According to the invention, the gas for producing cleaning jets is fed to the cleaning nozzles with a pressure that lies between 1 and 60 bar, preferably between 1 and 20 bar.

According to one variation of the inventive method, at least one cleaning nozzle is arranged in the plane of rotation of the rotor blades to be cleaned and spaced apart from the rotor blades such that the cleaning jet produced by the cleaning nozzle extends in the plane of rotation of the rotor blades to be cleaned. If a cleaning nozzle is arranged in this fashion, the cleaning jet acts upon the suction side and the pressure side of the rotor blades and removes ice layers and/or snow layers and/or third layers adhering thereto.

According to another variation of the inventive method, cleaning nozzles are arranged on the suction side and on the pressure side of the rotor blades to be cleaned in such a way that the cleaning jets produced by the cleaning nozzles act upon the surfaces of the rotor blades to be cleaned.

According to the invention, each cleaning nozzle is arranged in such a way that the smallest distance between the cleaning nozzle and a rotor blade lies between 1 and 100 mm, preferably between 1 and 20 mm.

According to an additional development of the inventive method, it is proposed that the rotor blades are cleaned in a time-controlled fashion, wherein the time interval between two successive cleaning processes preferably lies between 1 and 60 min. According to one variation of the inventive method, a cleaning process is triggered as soon as the refrigerating capacity of the refrigerating device falls short of a certain value or as soon as the power required for driving the rotor blades to be cleaned exceeds or falls short of a certain value.

The invention furthermore pertains to an apparatus for removing ice layers and/or snow layers and/or dirt layers from the rotor blades of axial fans in cooling installations for refrigerating and/or freezing products.

With respect to the apparatus, the aforementioned objective is attained in that at least one device for producing a cleaning substance jet is arranged in the vicinity of the rotor blades and able to produce a cleaning substance jet that is directed toward the rotor blades within certain time intervals, wherein this cleaning substance jet separates and transports away ice layers and/or snow layers and/or dirt layers on the surfaces of the rotor blades due to its momentum.

According to one preferred embodiment of the inventive apparatus, the device for producing a cleaning substance jet consists of a nozzle (cleaning nozzle) that can be supplied with a substance or a substance mixture in order to produce the cleaning jet.

According to an additional development of the inventive apparatus, it is proposed that one or more cleaning nozzles are arranged in the plane of rotation of the rotor blades to be cleaned and aligned such that the cleaning jets produced by the cleaning nozzles extend in the plane of rotation of the rotor blades and are directed toward the rotational axis of the rotor blades.

According to one embodiment of the inventive apparatus, at least one cleaning nozzle is arranged on the suction side and at least one other cleaning nozzle is arranged on the pressure side of the rotor blades to be cleaned, wherein each of the cleaning nozzles is aligned such that the cleaning jet produced by the cleaning nozzle is directed toward the surfaces of the rotating rotor blades.

According to another preferred embodiment of the inventive apparatus, the cleaning nozzles are realized in the form of supersonic nozzles suitable for producing gaseous cleaning jets that exit with supersonic speed.

Each of the cleaning nozzles is advantageously arranged at a minimum distance from the rotor blades that lies between 1 and 100 mm, preferably between 1 and 20 mm.

The invention is suitable for cleaning rotors of axial fans in all conceivable cooling installations for refrigerating and/or freezing products. The advantages attained with the invention manifest themselves, in particular, in devices with treatment zones, into which large quantities of humidity are admitted, for example, in tunnel frosters for refrigerating and/or freezing food products, particularly unpackaged food products. Humidity is admitted into the treatment zones of such tunnel frosters with the food products that generally have a high water content, as well as the humid ambient air taken in on both open ends of the tunnel froster.

The invention provides a number of advantages compared to the state of the art:

The rotor blades of axial fans in refrigerating devices are cleaned within shorter time intervals because the cleaning takes place during the operation of the refrigerating device, i.e., without interrupting the production. Consequently, a cleaning process is already carried out at a slightly decreased production capacity such that the average production capacity of an installation for refrigerating and/or freezing is significantly increased. In addition, the effectiveness of a more complex production process, in which the refrigerating and/or freezing of products only represents a partial aspect, is also improved due to the largely constant production capacity.

BRIEF DESCRIPTION OF THE DRAWINGS

The invention is described in greater detail below with reference to embodiments that are schematically illustrated in the figures.

In these figures.

DETAILED DESCRIPTION OF THE INVENTION

In the four embodiments shown, identical components are identified by the same reference symbols.

Figure 1:
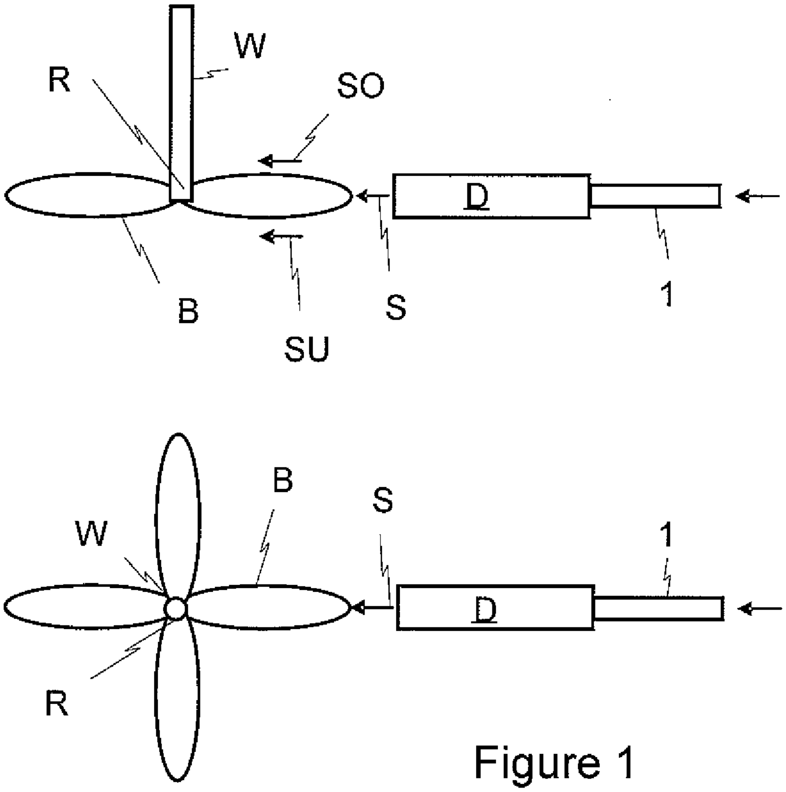
FIG. 1 shows a side view and a top view of the rotor of an axial fan with a nozzle for generating a cleaning jet.

FIG. 1 shows a rotating rotor R of an axial fan that consists of a rotor shaft W that is arranged on the suction side and four rotor blades B.

A nozzle D for producing a cleaning jet S is supplied with nitrogen via a line 1 and arranged in the plane of rotation of the rotor blades B, as well as spaced apart from the ends thereof by approximately 10 mm. The nozzle D is aligned such that the cleaning jet S produced therein is directed toward the rotor shaft W and extends in the plane of rotation of the rotor blades B. One part SU of the cleaning jet S acts upon the pressure sides of the rotor blades B while the other part SO acts upon their suction sides. The rotation of the rotor R results in the cleaning jet S acting upon all four rotor blades B and removing ice and dirt from all sides thereof due to its momentum.

Figure 2:
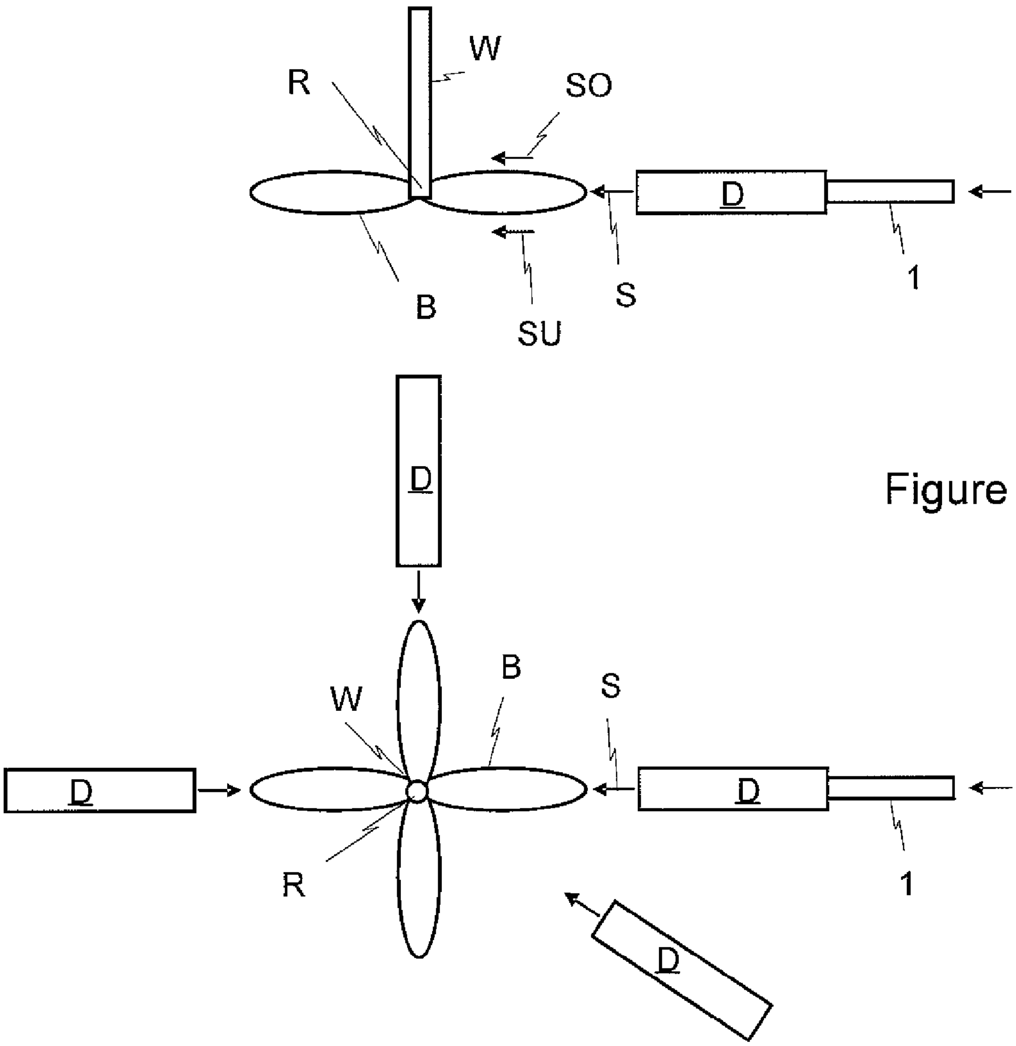
FIG. 2 shows a side view and a top view of the rotor of an axial fan with four nozzles for generating cleaning jets.

The embodiment illustrated in FIG. 2 differs from the embodiment according to FIG. 1 in the number of cleaning jets. Four nozzles D arranged on the circumference of the rotor produce four cleaning jets S. This arrangement results in shorter cleaning times and also has a superior cleaning performance.

Figure 3:
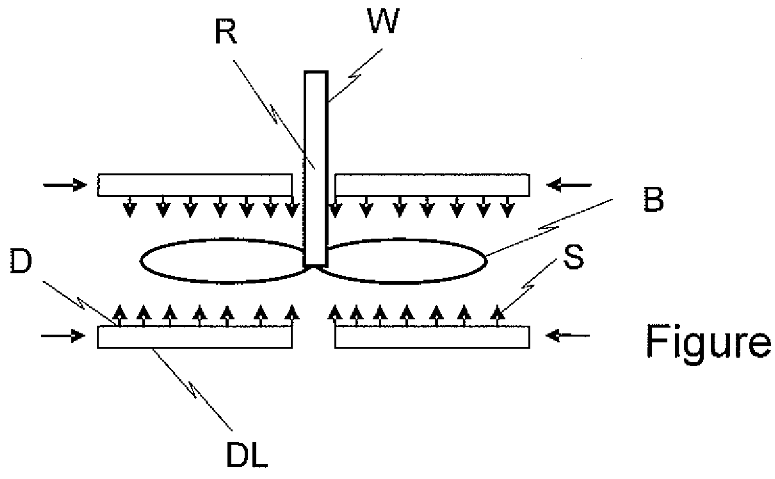
FIG. 3 shows the rotor of an axial fan with two respective nozzle lips for generating a multitude of cleaning jets on the suction side and the pressure side.

FIG. 3 also shows a rotating rotor R of an axial fan that consists of a rotor shaft W arranged on the suction side and four rotor blades B. Nozzle lips DL that respectively feature an open and a closed end are arranged on the suction and the pressure sides of the rotor blades. Gaseous nitrogen is introduced into the nozzle lips DL at the open ends and exits through a multitude of bores D. The bores D act as nozzles and produce a multitude of cleaning jets S that are directed parallel to the rotor shaft W and clean the rotor blades B from both sides.

Figure 4:
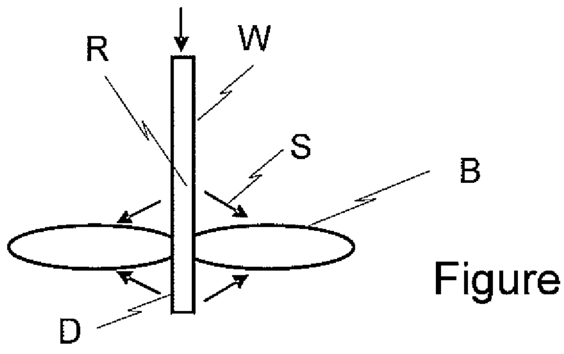
FIG. 4 shows the rotor of an axial fan with a hollow drive shaft, from which cleaning jets are ejected through bores.

FIG. 4 shows a rotating rotor R of an axial fan that consists of a rotor shaft W in the form of a hollow shaft arranged on the suction side and four rotor blades B. The rotor shaft W has an open end and a closed end. Gaseous nitrogen is introduced into the rotor shaft W at the open end and exits through eight bores D. The eight bores D act as nozzles and produce eight cleaning jets S, wherein one respective cleaning jet S is directed toward each side of the four rotor blades.

The invention claimed is:

1. An apparatus for removing ice layers, snow layers and/or dirt layers from rotor blades of axial fans in a cooling installation for refrigerating and/or freezing products, comprising:

at least one nozzle arranged on a suction side of the rotor blades, the at least one nozzle supplied with a substance to produce a gas cleaning jet, and adapted to coact with the cooling installation during operation for producing gas cleaning jet which is arranged in a vicinity of and directed to the rotor blades within certain time intervals, at least one other nozzle arranged a pressure side of the rotor blades, wherein each of the nozzles is aligned such that the gas cleaning jet produced by the at least one nozzle is directed toward surfaces of the rotor blades, and wherein the gas cleaning jet comprises gas selected from the group consisting of nitrogen, carbon dioxide, and mixtures of nitrogen and cargon dioxide, and comprises a momentum that separates and transports away said layers on the surfaces of the rotor blades.

* * * * *